United States Patent [19]

Mayfield

[11] Patent Number: 4,677,869

[45] Date of Patent: Jul. 7, 1987

[54] LINEAR ACTUATOR

[75] Inventor: Ralph W. Mayfield, Cincinnati, Ohio

[73] Assignee: Cincinnati Milacron Inc., Cincinnati, Ohio

[21] Appl. No.: 801,667

[22] Filed: Nov. 25, 1985

[51] Int. Cl.⁴ ............................................. F16H 1/18
[52] U.S. Cl. .................................. 74/424.8 R; 74/459
[58] Field of Search .......... 74/424.8 R, 459, 424.8 A, 74/424.8 B, 458, 89.15

[56] References Cited

U.S. PATENT DOCUMENTS

| | | | |
|---|---|---|---|
| 3,198,029 | 8/1965 | Orner | 74/424.8 A |
| 4,074,585 | 2/1978 | Richaud et al. | 74/424.8 R |
| 4,211,125 | 7/1980 | Benton | 74/424.8 R |
| 4,258,584 | 3/1981 | Haegele et al. | 74/424.8 R |
| 4,557,156 | 12/1985 | Teramachi | 74/459 |
| 4,564,993 | 1/1986 | Blaurock et al. | 74/424.8 R |
| 4,604,911 | 8/1986 | Teramachi | 74/424.8 R |

Primary Examiner—Cornelius J. Husar
Assistant Examiner—Peter M. Cuomo
Attorney, Agent, or Firm—Thomas M. Farrell

[57] ABSTRACT

A linear actuator comprising a ball screw, ball nut, and an endless ball circuit disposed between the two has an improved end closure body having a guide portion extending to approximately one revolution of the helical path around the screw out of the nut, where the balls then depart from the helical screw path and are received in a nonlinear ball passage formed within the closure. The ball passage has a first portion tangent to the ball screw groove and a second portion extending out of the end face of the closure in line with a longitudinal hole in the ball nut so that the balls may be smoothly returned through the nut to the opposite end, for reentry into the helical ball path.

3 Claims, 8 Drawing Figures

LINEAR ACTUATOR

BACKGROUND OF THE INVENTION

The invention concerns itself with the ball screw art in general, and, in particular, relates to an improved method and apparatus for the return portion of a ball circuit.

Most linear actuator assemblies having antifriction elements are structurally similar. A ball screw is formed with a helical groove or ball path, and a ball nut body is formed with a similar helical ball path through its bore, and a continuous endless circuit of balls is disposed within the nut to provide rolling elements. It is necessary in such ball screw assemblies to provide a means for routing the balls, exiting one end of the nut during their excursion, around to the other end of the nut where the circuit is restarted into the helical ball path.

Many prior art assemblies utilize a transversely drilled hole at each end of the nut which intercepts the ball track, and an external ball return tube is connected between the two holes to provide the return path. The return tube structure creates a non-circular cross-section envelope for the nut which, in many assemblies, makes it difficult to mount the nut without first relieving a machine mounting bore by a milling operation, to accept the ball return tube. An example of such a ball nut is shown in U.S. Pat. No. 3,244,022.

Still other prior art ball screw assemblies utilize a longitudinal return hole through the nut body, parallel to the central axis, where the balls are fed into the nut body return hole at one end and returned to the entrance, or beginning helical ball path portion of the nut. These return hole assemblies require end closures for the nut in order to turn the ball circuit in the opposite direction. These recirculating ball screw assemblies may use a nonmetallic end closure cap which is grooved at the interface between the nut and cap to provide a channel for the ball return circuit. An example of this type of structure is shown in U.S. Pat. No. 4,074,585, in which a single ball nut has a pair of end closures which are grooved to guide the balls at the end face of the nut. The structure shown in this patent requires the relief of the end of the return hole on the nut, to minimize jamming of the balls at the interface. The closure shown is bolted tightly to the end of the nut and is thus constrained from free movement with respect to the nut. Additionally, the end closure is counterbored slightly so that it may be centered accurately on the ends of the nut in assembly. A difficulty arises in use of a nut of this sort, since the plastic end closure is very active in response to thermal changes. Thus, as temperature changes are experienced by the end closure, dimensional changes may shift and distort the groove with respect to the nut and may create a condition which jams the balls. Once the balls have jammed at the interface of the two members, skidding will immediately take place and the balls, nut and/or screw may be seriously damaged. Another difficulty may be encountered when using a structure similar to the reference patent in that it is difficult to connect the assembly to a similar assembly in order to provide a backlash-free system. Back-to-back assemblies would result in relatively spongy plastic members absorbing much of the load, thereby resulting in a low static stiffness assembly.

Applicant has obviated the difficulties inherent in the prior art assembly by a structure which utilizes a return hole through the nut body, in combination with an end closure device which controls the ball circuit through approximately one revolution around the screw out of the nut, at which point the balls are received in an internal passageway located within the nut closure, the passageway being formed of a first portion generally tangential to the helical ball path, and a second portion which is in line with the return hole of the nut. The first and second portions are blended smoothly into one another to govern the balls through a turn around path.

It is therefore and object of the present invention to provide an improved linear actuator assembly which is relatively jam-proof at the ball nut return points.

Another object of the present invention is to provide an end closure assembly for a linear actuator which is relatively jam-proof during ambient thermal excursions.

SUMMARY OF THE INVENTION

The invention is shown in a linear ball screw and nut assembly wherein a continuous ball circuit is moved through a helical ball path within the nut and along the screw. The balls are guided out of the nut and are returned through a hole in the nut to the opposite end. A closure is used at the ball nut ends and a groove or ball guide portion within the closure which extends for approximately one revolution of the endless ball circuit around the screw out of the nut, at which point the balls are received in a nonlinear ball passage formed within the closure body, the passage having first portion tangent to the ball screw groove, and a second portion parallel to and in line with, the longitudinal axis of the return hole. The first and second portions are smoothly blended to one another. A means is provided for preventing relative rotation between the closure body and nut in assembly, the preferred means being a pin and a radial slot engaged to prevent relative rotation, yet permitting radial growth of the closure in response to temperature changes.

DESCRIPTION OF THE PREFERRED EMBODIMENT

Figure 1:
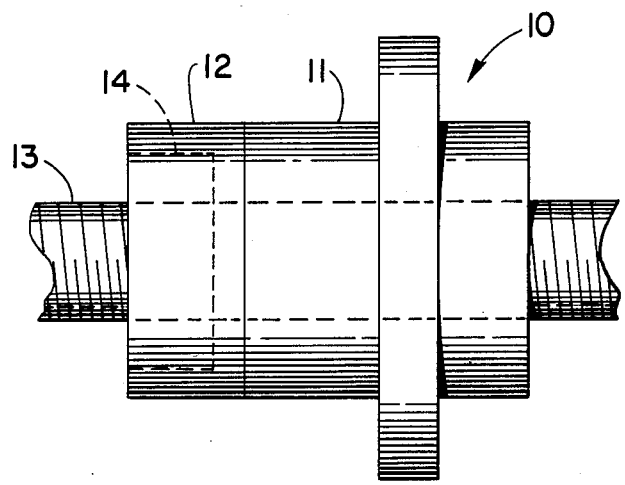
FIG. 1 of the drawings illustrate a ball screw with a preloaded ball nut assembly.

FIG. 1 depicts a preloaded ball nut assembly 10 wherein a pair of ball nuts 11,12 are carried on a ball screw 13. Here it should be noted that while the assembly 10 is depicted in a horizontal direction, the preferred embodiment may be carried in any attitude. Additionally, the ball nuts 11,12 may be held stationary while the screw 13 is rotated or the nuts 11,12 may be driven on a stationary screw 13. The ball nut assembly 10 is principally comprised of a flanged ball nut 11 and a trailing ball nut 12, locked together. A special nut closure 14 is utilized in the assembly 10, and is depicted more clearly in the section of FIG. 2.

Figure 2:
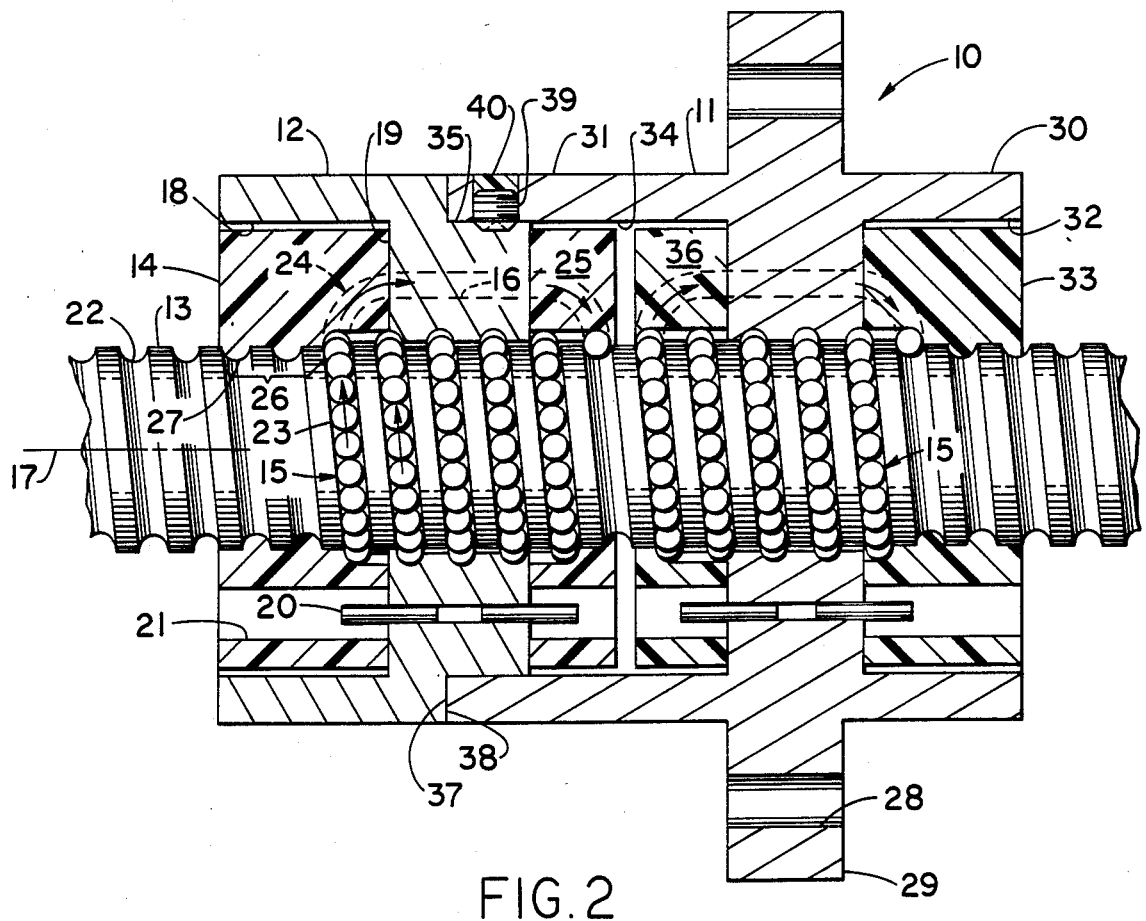
FIG. 2 is an enlarged longitudinal section through the ball nut assembly of FIG. 1.

As FIG. 2 shows, the flanged ball nut 11 and trailing ball nut 12 each have their own endless ball circuit 15 carried by the nuts 11,12 and the ball screw 13. Description of the operation and assembly of one nut pertains to the other nut, since both have a like assembly with regards to the ball circuit. The trailing ball nut 12 has an axial hole 16 drilled through the nut body parallel to the longitudinal axis 17 of the ball screw 13. A ball nut end closure 14 is provided at the exterior end of the nut 12 and is seated within a clearance counterbore 18 against the interior face 19 of the nut 12. The closure 14 and nut 12 are prevented from relative rotation with one another in assembly by means of a pin 20 extending from the interior face 19 into a radial slot 21 of the closure 14. In this manner the assembler may dispense with axial fasteners, since the two members 12,14 are guided by the same ball screw helical path 22, and will move in unison. The end closure 14 may grow in response to thermal changes, and such growth will be accommodated in a radial direction by the slot 21 and by the clearance counterbore 18. The end closure 14 guides the ball circuit 15 for approximately one revolution out of the ball nut 12, at which point the balls 23 are received in an internal passageway 24 within the end closure 14 and the balls 23 are then guided back through the return hole 16 of the nut 12 to an opposite, inner end closure 25 of similar structure. Here it may be noted that the outer end closure 14 is of longer axial length than the inner end closure 25 because the outer end closure 14 has a wiper portion 26 consisting of a thread-like form 27 smoothly following the helical ball path 22 of the screw 13. The thread-like form 27 will wipe the ball screw 13 clean of debris and, in the assembly shown, where the end closure 14 is formed from nonmetallic material, small particles may also embed themselves within the form 27 to protect the ball circuit 15. The inner nut end closure 25 serves only to provide the directional change to the ball circuit 15 for reentry into the ball nut 12 in the assembly shown.

The flanged ball nut 11 is provided with a series of axial holes 28 for fastening the flange 29 to a machine structure (not shown) and the flanged nut 11 has opposite flange-extending hubs 30,31, wherein the first hub 30 has a clearance counterbore 32 for receiving an outer end closure 33 similar to that of the trailing nut 12. The second hub 31 has a counterbore 34 for receiving a closely-fitted pilot diameter 35 of the trailing nut 12, and the counterbore 34 provides clearance around the two inner end closures 25,36. The end 37 of the second hub 31 is square with the screw 13 and received against a shoulder 38 of the trailing nut 12. The second hub 31 is also provided with a radially-extending cup point set screw 39, which is secured tightly so as to embed the point within the pilot diameter 35 of the trailing nut 12 after the nuts 11,12 have been countertorqued to a preset load. In the preferred embodiment, W. the set screw 39 is then "potted" in assembly an epoxy cement 40.

Figure 3:
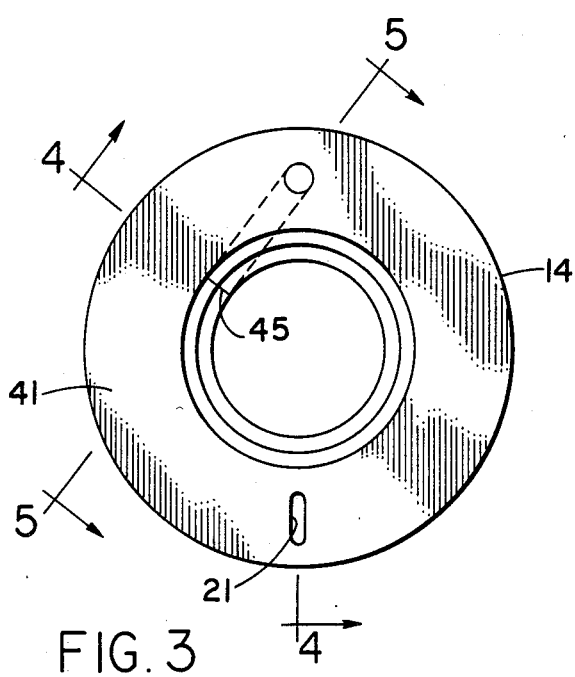
FIG. 3 is an end view of the closure of FIG. 2.
Figure 4:
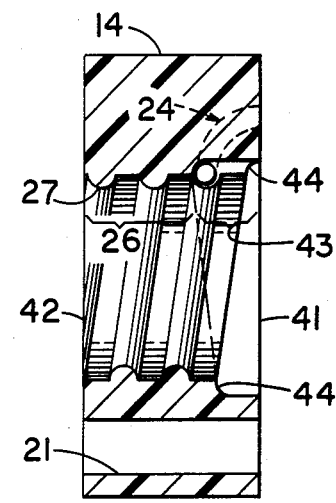
FIG. 4 is a longitudinal cross-section through the end closure, taken along the line 4—4 of FIG. 3.

FIG. 3 is an end view of the outer end closure 14 of FIG. 2, showing that the closure 14 has a cylindrical body and, referring also to FIG. 4, an axial slot 21 extends through the body and allows for radial movement of the nut closure 14 on a pin 20 in response to thermal changes. The closure body 14 has parallel end faces 41,42 and, as previously discussed, the outermost end has a thread-like form 27 mated to the ball groove of the screw 13, to constitute a wiper portion 26 of the closure 14. The wiper portion 26 is well-known in the prior art. The closure body has a ball guide portion 43 at its innermost end, resembling an ever-deepening counterbore comprising a quarter-round groove 44 formed along a helix in the closure 14 for approximately one revolution, in accordance with the lead of the screw 13.

Here it may be noted that while the guide portion 43 needs only to be deep enough into the closure 14 to practically accommodate the ball passage 24, i.e. less than one full revolution and even though the balls 23 are governed by the lead of helical path 22 of the screw 13 some radial load may be seen by the quarter-round groove 44, and a full revolution of the groove 44 will tend to balance radial loading, thus maintaining the centrality of the closure 14 on the screw 13.

Figure 5:
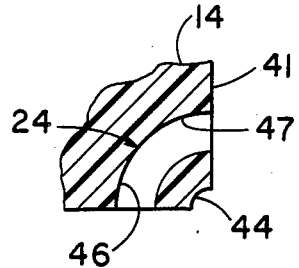
FIG. 5 is a section taken through the ball passage of the end closure taken along the line 5—5 of FIG. 3.
Figure 6:
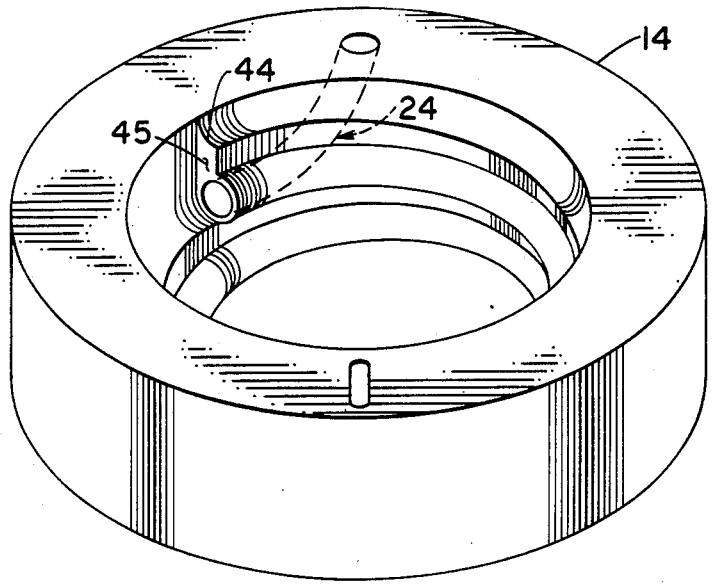
FIG. 6 is a perspective view of the end closure.

The ball guide portion 43 terminates at a flat radial face 45, i.e. on the radial cutting plane 4—4, where the thread-like form 27 commences for the remainder of the helix within the closure 14. At the flat face 45, a ball passage 24 is formed within the closure body to receive the ball circuit 15 after it has traversed one revolution of the helical path 22 out of the ball nut 11. The balls 23 enter the passage 24 along a line approximately tangent to the circumference of the ball guide portion 43, and the ball passage 24 is nonlinearly formed, curving outward to the end face 41 of the closure 44. Thus, as shown in FIG. 5, the ball passage 24 is formed of at least two portions, the first portion 46 substantially tangent to the ball path 22, and a second portion 47 in line with the ball return hole 16 of the nut 11 of FIG. 2. The first and second portions 46,47 are smoothly blended together to form a continuous passage 24 of uniform cross-section to guide the balls 23. Here it should be noted that while the passage 24 is shown as a diameter smaller than the diameter of the thread-like form in FIG. 4 to exaggerate the construction for illustrative purposes only, the passage diameter and thread form 27 are substantially the same. Further, it has been found that it is unnecessary to have a close fitting diameter for the passage of the balls 23, and that a sufficient passage diameter can be formed approximately 0.010 inch larger than the ball diameter. The passage 24 may also be formed with a non-circular cross-section. As FIG. 5 of the preferred embodiment illustrates, the passage 24 is molded into the closure body by conventional casting techniques; i.e. a master closure 14 may be first made from aluminum, and a silicon rubber mold may be created off the master to later form the finished cast product of urethane or other suitable engineering plastic. The core for the nonlinear ball passage 24 may be formed from a variety of well-known techniques, such as the use of: a disposable wax core, or a flexible core made of similar rubber molding material as is the master mold.

Figure 7:
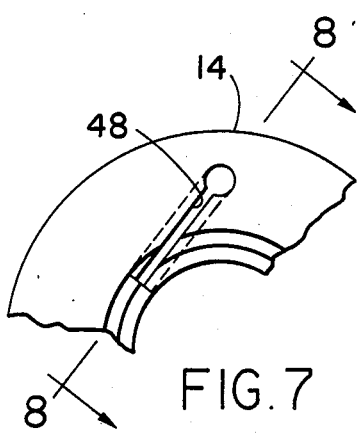
FIG. 7 is an alternate embodiment of the end closure of FIG. 3.
Figure 8:
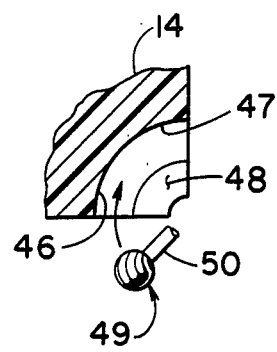
FIG. 8 is a section through the ball passage of the alternate embodiment taken along the line 8—8 of FIG. 7.

An alternate embodiment is depicted in FIG. 7, whereby a slot 48 may be machined into a closure 14 machined from solid bar stock, and the ball passage 24 may be machined into the solid closure body by passing a special ball end mill 49 through the closure body. Here, the ball end mill 49 has a reduced-diameter shank 50 to fit within the machined slot 48. The machined passage 24 is very suitable for the nut assembly 10 of FIG. 2, since a sufficient circumferential wrap is produced to retain the ball circuit 15 and govern its movement through the closure body.

Here it should be noted that while the inner nut end closures 25,26 are formed without a substantial thread-like form 27 for wiping the screw 13, but, are formed with at least sufficient material to support a flat radial face 45, as does the nut closure 14 of FIG. 3, wipers may be provided on the inner closures 25,36 as well.

It may also be noted that the nut closure 14 may be formed of metallic materials, but the preferred embodiment uses a low friction engineering plastic. It will be appreciated by those skilled in the art that the low friction engineering plastic may be also formed by other well-known means, for example, injection molding.

While the invention has been shown in connection with a preferred embodiment, it is not intended that the invention be so limited, but rather, the invention extends to all such designs and modifications as come within the scope of the appended claims.

I claim:

1. In a linear actuator having: a ball screw with a helical ball screw groove; a ball nut with a corresponding helical ball nut groove; a plurality of balls arrayed in an endless ball circuit extending along said ball nut groove, out of the opposite ends of said ball nut, and through a ball nut hole extending between said opposite ends of said ball nut; an improved nut closure device located proximate to at least one of said ball nut ends, wherein the improvement comprises:
    a closure body;
    a ball guide portion in said closure body extending for appoximately one revolution of said endless ball circuit around said ball screw;
    a non-linear closure ball passage formed in said closure body, said non-linear closure ball passage having:
        a first portion communicating with said ball guide portion and oriented substantially tangent to said ball screw groove; and
        a second portion parallel to the longitudinal axis of said ball screw and blending into said first portion; and
    means for preventing relative rotation between said closure body and said ball nut in assembly while said closure ball passage and said ball nut hole are in alignment.

2. An improved antifriction linear actuator assembly, utilizing:
    a nut body having:
        a nut bore extending axially through said nut body, said nut bore having a central longitudinal axis;
        a helical ball path extending through said nut bore, from one end to the other; and
        a ball return hole extending through said nut body, parallel to said nut bore;
    an endless ball circuit extending along said helical ball path, out of the ends of said nut body and through said ball return hole;
    and means for supporting said endless ball circuit in engagement with said helical ball path,
wherein the improvement comprises:
    means independent of said nut body for guiding said endless ball circuit for approximately one revolution of said endless ball circuit around a continuation of said helical ball path out of said nut body;
    passage means, independent of said nut body, for connecting said continuation of said helical ball path and said ball return hole, said passage means having a first portion substantially tangential to said continuation of said helical ball path and blending to a second portion in line with said ball return hole; and
    means for preventing relative rotation between said second portion of said passage means and said ball return hole, with respect to said central longitudinal axis.

3. An improved antifriction linear actuator, utilizing:
    a ball screw, having a helical ball screw path along its central longitudinal axis;
    a pair of ball nuts on said ball screw, each ball nut having a helical ball nut path corresponding to said helical ball screw path and an each ball nut having a ball nut body and an axial ball return hole through said body of said ball nut parallel to said central longitudinal axis of said helical ball screw path; and
    a pair of endless ball circuits, each independently carried by its respective ball nut on said helical ball screw path
wherein the improvement comprises: guide means, independent of said pair of ball nuts, for guiding each of said pair of endless ball circuits out of said pair of ball nuts for approximately one revolution of said endless ball circuits around a continuation of said helical ball nut path out of said ball nuts;
    passage means, independent of said pair of ball nuts, for connecting said continuation of said helical ball nut path and said axial ball return hole of each of said pair of ball nuts, said passage means having a first portion substantially tangential to said continuation of said ball nut path and blending to a second portion in line with said axial ball return hole;
    means for preventing relative rotation between said second portion of said passage means and said axial ball return hole, with respect to said central longitudinal axis;
    pilot means for coupling said pair of ball nuts to one another; and
    locking means for preventing relative rotation between said pair of ball nuts.

* * * * *